United States Patent
Ilan et al.

(10) Patent No.: US 10,685,332 B2
(45) Date of Patent: Jun. 16, 2020

(54) CONTEXTUAL MODEL-BASED EVENT SCHEDULING

(71) Applicant: Intel Corporation, Santa Clara, CA (US)

(72) Inventors: Gili Ilan, Hertzeliya (IL); Noam Sagi, Kibbutz Nahsholim (IL); Gil Sharon, Even-Yehuda (IL); Oded Vainas, Petah Tiqwa (IL); Ronen Aharon Soffer, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 15/191,594

(22) Filed: Jun. 24, 2016

(65) Prior Publication Data
US 2017/0372268 A1    Dec. 28, 2017

(51) Int. Cl.
G06Q 10/10    (2012.01)
G06N 20/00    (2019.01)
H04M 3/56    (2006.01)

(52) U.S. Cl.
CPC ......... *G06Q 10/1095* (2013.01); *G06N 20/00* (2019.01); *H04M 3/563* (2013.01)

(58) Field of Classification Search
CPC .... G06Q 10/1095; G06N 20/20; H04M 3/563
See application file for complete search history.

(56) References Cited

U.S. PATENT DOCUMENTS

| 7,305,437 | B2 | 12/2007 | Horvitz et al. |
| 8,938,220 | B2 | 1/2015 | Kho |
| 2003/0204474 | A1 | 10/2003 | Capek et al. |
| 2009/0165022 | A1 | 6/2009 | Madsen et al. |

(Continued)

FOREIGN PATENT DOCUMENTS

| CN | 104506707 | 4/2015 |
| KR | 1020130119133 | 10/2013 |

(Continued)

OTHER PUBLICATIONS

Danninger, Maria, "MyConnector—Analysis of Context Cues to Predict Human Availability for Communication", (Nov. 2, 2006), 8 pgs.

(Continued)

*Primary Examiner* — Nadja N Chong Cruz
(74) *Attorney, Agent, or Firm* — Schwegman Lundberg & Woessner, P.A.

(57) ABSTRACT

Various techniques for performing contextual event scheduling with an event scheduling service are disclosed herein. In an example, data is processed at an event scheduling service, based on the use of a trained machine learning model that is specific to a user. This trained machine learning model is operated by the event scheduling service determine a proposed time and proposed scheduling parameters based on the contextual information, to identify a proposed event time and event scheduling parameters based on the model, the data indicating a user state, or external data. Further examples to evaluate user activity and identify schedule characteristics based on data inputs from a user's mobile computing device, wearable sensors, and external weather, traffic, or event data sources, are also disclosed.

25 Claims, 9 Drawing Sheets

(56) References Cited

U.S. PATENT DOCUMENTS

| | | | |
|---|---|---|---|
| 2009/0177503 A1* | 7/2009 | Kawano | G06Q 10/02 705/5 |
| 2010/0217644 A1 | 8/2010 | Lyle et al. | |
| 2011/0184772 A1 | 7/2011 | Norton et al. | |
| 2012/0317195 A1 | 12/2012 | Pasala et al. | |
| 2013/0144952 A1* | 6/2013 | Lucey | H04L 65/403 709/204 |
| 2013/0295956 A1* | 11/2013 | Ding | H04W 4/025 455/456.1 |
| 2014/0099614 A1 | 4/2014 | Hu et al. | |
| 2014/0108307 A1 | 4/2014 | Raghunathan et al. | |
| 2014/0273988 A1 | 9/2014 | Mermelstein | |
| 2015/0046440 A1 | 2/2015 | Shoham et al. | |
| 2015/0058057 A1* | 2/2015 | Egan | G06Q 10/1095 705/7.19 |
| 2015/0371195 A1 | 12/2015 | Boss et al. | |
| 2016/0007165 A1* | 1/2016 | Somer | H04W 4/029 455/404.2 |
| 2016/0098687 A1* | 4/2016 | Lamons | G06Q 10/1095 705/7.19 |
| 2017/0372267 A1 | 12/2017 | Soffer et al. | |

FOREIGN PATENT DOCUMENTS

| | | | |
|---|---|---|---|
| KR | 1020160004598 | | 1/2016 |
| WO | WO-2008053467 A2 * | | 5/2008 ........... G06Q 10/109 |
| WO | 2011001291 | | 1/2011 |
| WO | 2016054629 | | 4/2016 |
| WO | 2016097381 | | 6/2016 |
| WO | 2017222693 | | 12/2017 |
| WO | 2017222695 | | 12/2017 |

OTHER PUBLICATIONS

Gurram, Gopal Rao, "Locale-Reminder: An Android Application", Graduate Project, (2015), 1-69.

Krause, Andreas, "Context-Aware Mobile Computing: Learning Context-Dependent Personal Preferences from a Wearable Sensor Array", IEEE Transactions on Mobile Computing, vol. 5, No. 2, (Feb. 2006), 1-15.

"International Application Serial No. PCT/US2017/033339, International Search Report dated Aug. 8, 2017", 3 pgs.

"International Application Serial No. PCT/US2017/033339, Written Opinion dated Aug. 8, 2017", 9 pgs.

"International Application Serial No. PCT/US2017/033306, International Search Report dated Aug. 22, 2017", 3 pgs.

"International Application Serial No. PCT/US2017/033306, Written Opinion dated Aug. 22, 2017", 10 pgs.

"U.S. Appl. No. 15/191,591, Non Final Office Action dated Jul. 2, 2018", 32 pgs.

"U.S. Appl. No. 15/191,591, Response filed Nov. 1, 2018 to Non Final Office Action dated Jul. 2, 2018", 17 pgs.

"International Application Serial No. PCT/US2017/033306, International Preliminary Report on Patentability dated Jan. 3, 2019", 12 pgs.

"International Application Serial No. PCT/US2017/033306, International Preliminary Report on Patentability dated Aug. 22, 2017", 11 pgs.

"International Application Serial No. PCT/US2017/033339, International Preliminary Report on Patentability dated Jan. 3, 2019", 11 pgs.

"International Application Serial No. PCT/US2017/033339, International Preliminary Report of Patentability dated Aug. 8, 2017", 10 pgs.

"U.S. Appl. No. 15/191,591, Advisory Action dated Jun. 10, 2019", 3 pgs.

"U.S. Appl. No. 15/191,591, Final Office Action dated Feb. 21, 2019", 29 pgs.

"U.S. Appl. No. 15/191,591, Response filed May 21, 2019 to Final Office Action dated Feb. 21, 2019", 13 pgs.

* cited by examiner

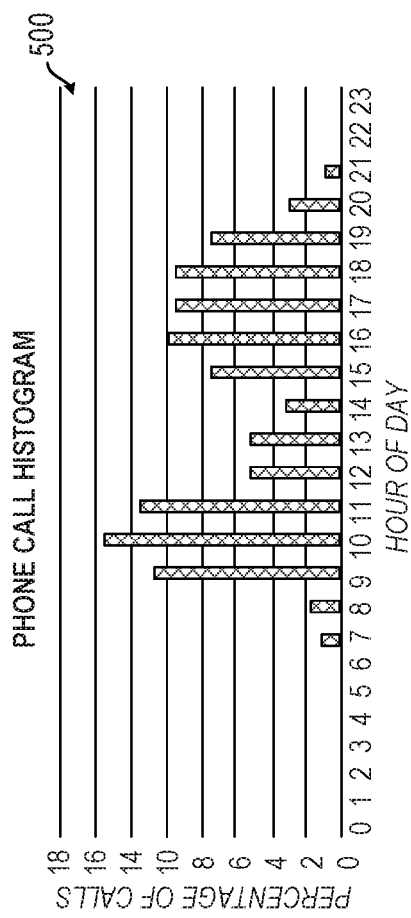
FIG. 5
FIG. 6
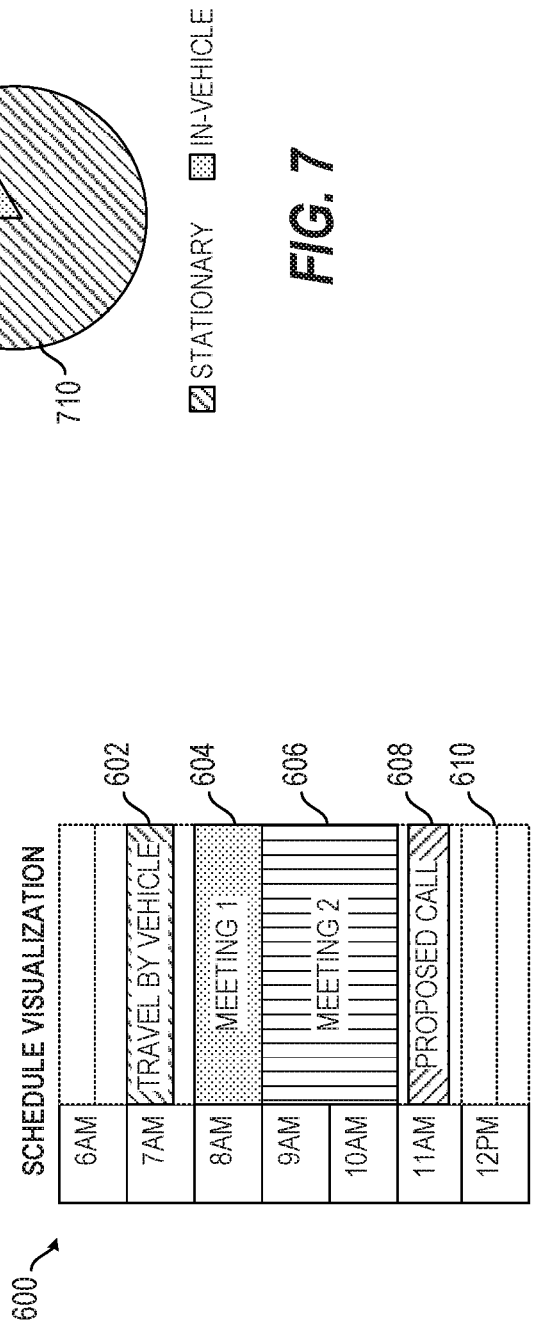
FIG. 7

CONTEXTUAL MODEL-BASED EVENT SCHEDULING

TECHNICAL FIELD

Embodiments described herein generally relate to scheduling and communication functions implemented on electronic devices and, for some examples, the control and operation of scheduling and communication software features for conducting an electronic communication event with devices such as mobile smartphones, wearable devices, and related data communication systems.

BACKGROUND

A live audio conference (e.g. a phone call or voice-over-IP session) is frequently used as a means of communication by human users. Although people rely on this form of communication at multiple times of a day, a contacting user is typically not aware of the availability constraints of the contacted user before the call is attempted (such as whether the contacted user is participating in an ongoing meeting, located in a noisy environment, involved in a current activity, etc.). As a result, time and effort is often spent in exchanging back-and-forth communications between people (or human assistants) to identify the optimal time for a call or session—often through the manual exchange of verbal messages or digitally written communications.

Some computerized programs provide event scheduling features that consider a contacted user's calendar status and constraints. However, existing digital assistant solutions and calling applications often perform this determination using outdated or incomplete information. As a result, many types of scheduling activities are still performed manually with human intervention. This requires extra effort for the user, inefficiencies with communication devices and networks, and ultimately, does not avoid missed communication opportunities.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 illustrates a histogram representing data used in machine learning model scheduling operations, according to an example;

FIG. 6 illustrates a visualization of a schedule implemented with model scheduling operations, according to an example;

FIG. 7 illustrates a chart representing data used in machine learning model scheduling operations, according to an example;

DETAILED DESCRIPTION

Figure 1:
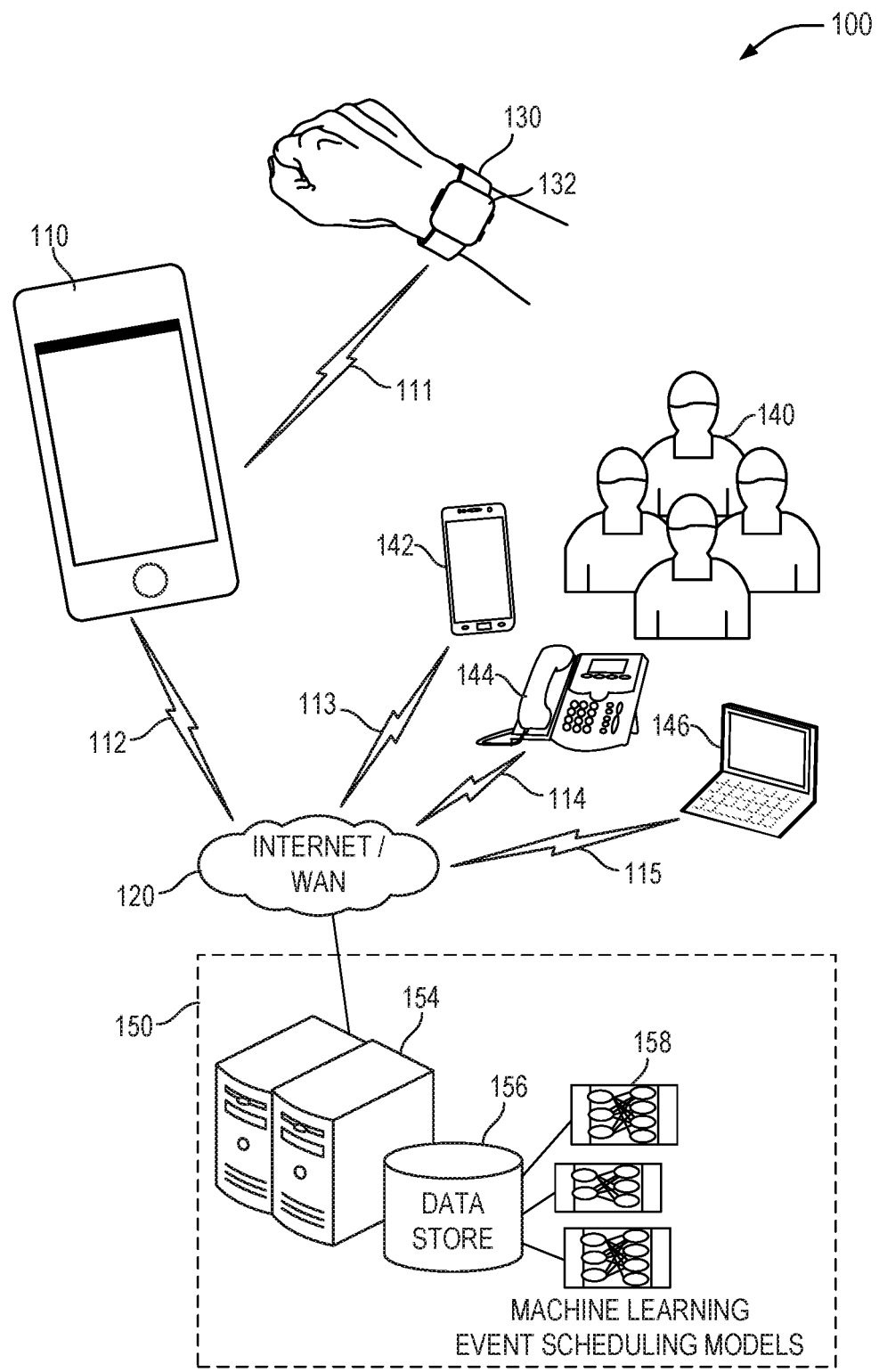
FIG. 1 illustrates an overview of a communications environment including processing and interactions among a computing device, a wearable device, and an event scheduling service, for implementing event scheduling, according to an example.

In the following description, methods, configurations, device components, and related apparatuses are disclosed that provide contextual event scheduling using data processed at an event scheduling service, based on the use of a machine learning model. This data is processed based on offline data training of the model and online data provided to the model from various user-specific and user-generic (e.g., external) data sources. As a result, a logic rules-learning model may be used to identify and apply an appropriate scheduling time and parameters for an electronic communication event, based on historical and real-time data inputs from user devices. This may assist users (and the electronic devices operated by the users) to identify and utilize a best contextual and semantic time to conduct a communication event such as a phone call, videoconference, chat session, or the like.

In an example, the presently described techniques and configurations are applied to enable a virtual computerized assistant, scheduling program, communication program, or other software utility, to consider a context, calendar availability, calling patterns and routines for the scheduling of events—for a single user or even between two users. Such functionality is not provided in current digital assistant products such as Google® Now, Apple® Siri, Microsoft® Cortana, or in phone or voice-over-IP applications Skype™, Viber™, Tango™, and the like. Rather, current digital assistant products do little more than display availability from a user's calendar (if calendar information is available). The presently described techniques describe the technical infrastructure used to perform intelligent and context-sensitive scheduling of an electronic communication event, with the context being determined from a combination of real-time and online data, and processing of such data from historical data trained models.

As an example of usage of the present techniques, for many users, a preferred time for conducting an electronic communication event (e.g., a phone call) may be based on a user's schedule that has repeating characteristics. For some users, this may occur during a repeating routine of the user, such as a given time of the day, at lunch break, after a commute, or the like. For other users, the preferred time may be based on a given context of user activity, such as talking while driving, at home, etc. The historical data from user routines and the current data from user activity context may be analyzed and provided to a scheduling service for use in a trained machine learning mode. Data related to the availability constraints of the user, the other user, or other participants in a group such as an ongoing meeting, activity, environment, and the like may be processed and evaluated with the trained machine learning model. Further, data from external sources related to user activities, scheduling constraints, or communication preferences may also be processed and evaluated by the scheduling system.

Compared to the existing state of the art, the techniques described herein enable improvements to the operation of scheduling and communication software operating in computing devices, telecommunication networks, and data processing systems. These improvements also provide accuracy and performance benefits to the logic, search, and analytic functions performed in such devices, networks, and systems. Such features also improve the functioning of the hardware and software within the respective devices, networks, and systems, through reduced processing resulting from an improved accuracy in scheduling operations, reduced bandwidth and hardware usage by electronic communications, reduced (data-driven) user interactions, and improved success and accuracy of electronic communication sessions.

FIG. 1 illustrates an overview of an example communications environment 100 including processing and interactions among a computing device 110 (e.g., a smartphone), a wearable device 130 (e.g., a smartwatch), and an event scheduling service 150 (e.g., a cloud-based server), for implementing the presently described event scheduling techniques. It will be understood that additional components and circuitry not depicted in FIG. 1 may be used to implement the following data processing and communication techniques.

The computing device 110 is depicted as a smartphone, but in other examples, may be a desktop or notebook personal computer (PC), a tablet, a thin client device, or other form factor including an integrated or separate display screen. As shown, electronic communications with the computing device 110 may include communications 111 between the computing device 110 and the wearable device 130 (e.g., wireless communications using Bluetooth, Wi-Fi, near field communications (NFC), etc.), and communications 112 between the computing device 110 and the Internet/WAN (wide area network) 120. The computing device 110 may be communicatively coupled to other devices (not shown) via wired or wireless connections that communicate a digital signal.

The wearable device 130 is depicted as a smartwatch, but in other examples, may be provided in a smart bracelet, clothing, accessories, or in a standalone device form factor that is not necessarily wearable. The wearable device 130 may include or be coupled to at least one sensor (e.g., integrated within the housing, assembly, or unit of the wearable device 130), including sensors to detect physiological characteristics of the user (e.g., through a heart rate monitor, temperature sensor, activity sensor) or environmental characteristics of the user's environment (e.g., through an accelerometer, gyroscope, etc.). The wearable device 130 may also include at least one output medium, such as a touchscreen display 132, and at least one input medium, such as buttons exposed from an exterior of the wearable device 130 or touch input locations recognized by the touchscreen display 132. Other types of sensors and input/output mechanisms not depicted in FIG. 1 may be included in or coupled to the wearable device 130.

The sensor data produced from among the respective sensors of the wearable device 130 may be communicated to the computing device 110 via the communications 111. This sensor data may be used indicate real-time context information and user state that is relevant to scheduling operations. In certain examples, based on the number of sensors and the data processing involved, the wearable device 130 may perform electronic operations to process the sensor data directly at the wearable device 130. In other examples, the wearable device 130 may relay the sensor data to the computing device 110 for processing (including in scenarios where the computing device 110 further transmits the sensor data to a remote service for analysis).

The computing device 110 utilizes the communications 112 with the Internet/WAN 120 to connect to data services offered by the event scheduling service 150. The event scheduling service 150 may host and train scheduling models, process scheduling data with the scheduling models, and generate a proposed schedule/reschedule or proposed communication parameters (including time/date and medium characteristics) for an electronic communication event. The event scheduling service 150 may include features of a server computing system 154 to execute logic and perform analysis of event scheduling data models, a data store 156 to store the event scheduling data models and collect information related to the event scheduling functions, and machine learning models 158 that are stored, hosted, or persisted to facilitate the evaluation of scheduling data. Other features of the event scheduling service 150 not shown may include server management features, application programming interfaces, network data and processing balancing features, and other aspects of a server-/cloud-based processing system.

The computing device 110 is depicted as being connectable to a plurality of other communication devices associated with other users 140, with such other communication devices accessible via respective types of electronic communication mediums. The proposed electronic event scheduling operations, implemented with the event scheduling service 150, are performed to facilitate communications between the computing device 110 and the other communication devices (142, 144, 146) via these electronic communication mediums. For example, the other communication devices may include a mobile phone 142 accessible via a connection 113 with mobile phone (e.g., cellular) wide area voice and data networks; a phone 144 accessible via a connection 114 with landline (e.g., Plain Old Telephone System (POTS)) phone networks; and a computing device 146 accessible via a connection 115 with a wide area network (e.g., wired or wireless Internet connection).

Figure 2:
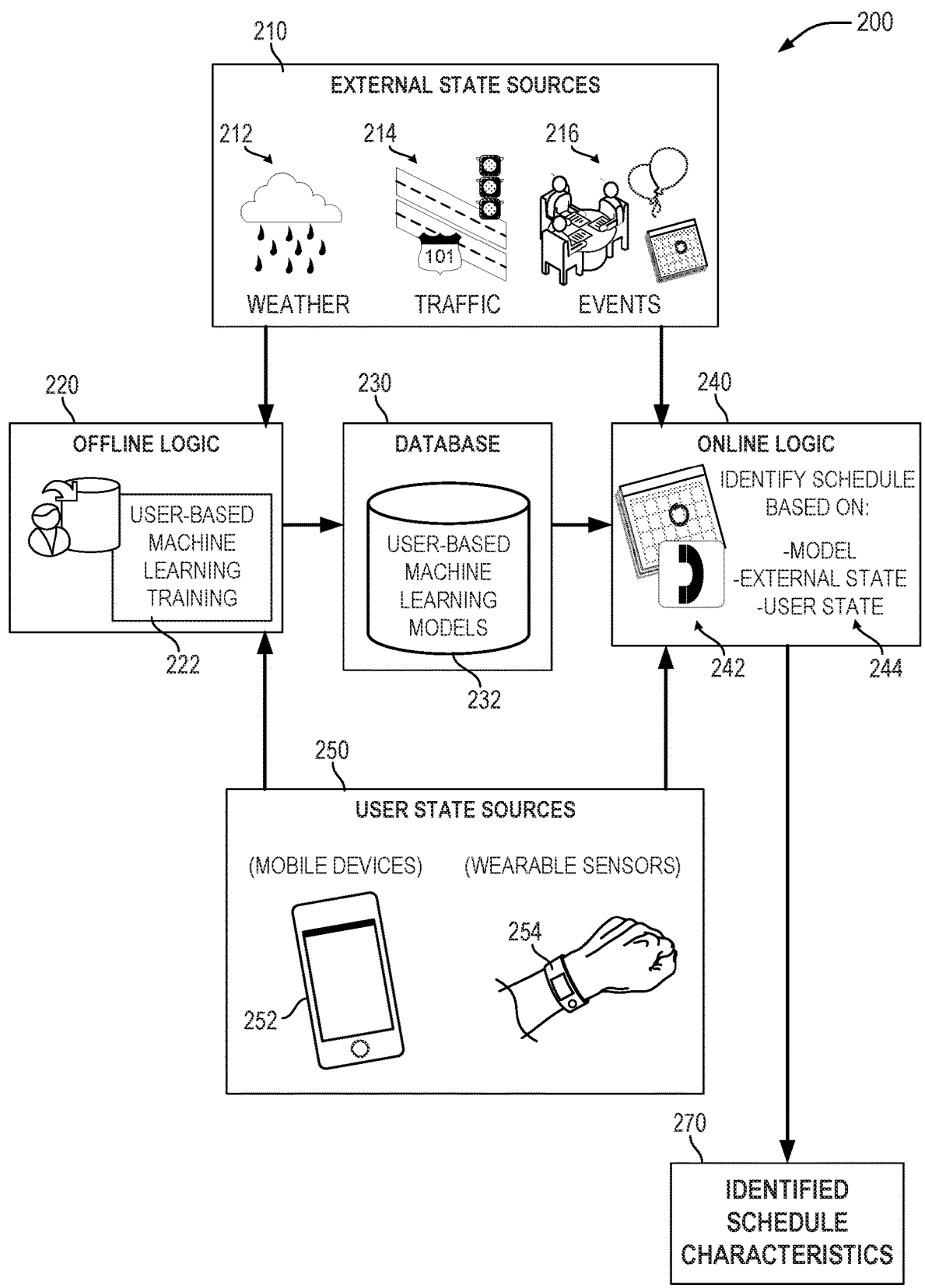
FIG. 2 illustrates a use case scenario of performing scheduling functions in a machine learning model with online and offline logic, according to an example.

FIG. 2 illustrates an example use case scenario 200 performing scheduling functions in a machine learning model with online and offline logic. In an example, the use case scenario 200 for scheduling or rescheduling an electronic communication event (such as a phone call) between two or more people may be used to locate a best fit for respective users' routine, needs, context and availability constraints. The operation of the use case scenario 200 may be facilitated by user interaction with an event scheduling service that operates machine learning models and logic, based on the following example.

As shown, the use case scenario 200 of FIG. 2 includes a series of data flows occurring from external state sources 210 and user state sources 250, which provide data for use with offline logic 220 (e.g., historical data model training through behavioral learning) and online logic 240 (e.g., real-time data model evaluation). The logic 220, 240 uses the information that is stored for two or more users to schedule or reschedule an electronic communication event (e.g., phone call) between them, at time slots that fit with each user's planned day. The logic 220, 240 evaluates the elements in the user's day and evaluates the user's common behavior for performing the communication with other people (the callees). From this logic, the scheduling system generates identified schedule characteristics 270 that indicate optimal times for the electronic communication event based on one (or both) party's availability characteristics. These availability characteristics may include schedule availability (based on calendar meetings), planned locations, nature of relationship (e.g. family, friends, colleagues, etc.), planned activity (e.g. driving, running), routine behavior (e.g. usually talk during work hours), and the like.

The offline logic 220 may be implemented in a scheduling system to perform user-customized machine learning training 222, such as to refine and improve the user-based machine learning models 232. These machine learning models may be stored in a database system 230 within the scheduling system. The offline logic 220 operates as a behavioral learning component that is adapted to a particular user through the use of the machine learning training 222. Such training takes into account the historical behavior of each user and the user's co-behavior of establishing a communication (e.g., a call) and the different contexts and states for making such communication. These data are processed and input to a personalized machine learning model for predicting the optimal time to make or reschedule a communication based on past behavior.

The online logic 240 performs functions to identify a schedule or schedule characteristics 270 for an electronic communication event. The online logic 240 may operate to compute recommended "optimal" timeslots for the intent of the communication (e.g., to schedule a communication after a particular activity). In an example, an optimal timeslot for the rescheduled event may be automatically "anchored" on the user's timeline (timeline 242). This may be performed with an "anchoring" component that considers a current user context, calendar availability of all involved users, planned activity of all involved users, and a prediction of the pre-trained machine learning model (data 244) for a future user context.

The offline and online logic modules 220, 240 receive data from mobile devices 252 and wearable sensors 254, as well as external state sources 210 that provide global data (e.g., applicable to multiple users). The data from a mobile device 252 and wearable sensor 254 of a particular user may include calendar appointments, tasks, phone calls, text messages, emails, location, connectivity (e.g., Wi-Fi/cellular, Bluetooth) information, activity (driving, running, etc.) information, environment noise, physiological data (e.g., pulse, body temperature, stress, sleep), and the like. This user-specific data is enhanced with the addition of data from external data sources such as weather data 212, public traffic data 214 or like transportation schedules (e.g., transit, flight schedule and locations), and known event data 216 that indicates events for the user or in proximity to the user. For example, if a user is driving in a traffic jam, the user may be able to immediately talk on a phone call; if weather conditions near a user are inclement, then a user may not be able to talk for a period of time (or may arrive late to a meeting); if a user is scheduled to attend an event that is busy, then the user may not be able to schedule a phone call immediately prior to or after the event.

The offline logic 220 and the online logic 240 also may be further customized for purposes of scheduling a voice communication event, particularly, a telephone or voice-over-IP call. With use of the offline logic 220 and the online logic 240, contextual constraints of the user to participate in a voice conversation may be taken into account, even though the user may have his or her phone at all times of the day and the user's phone call is capable of ringing at all times. For example, the voice call may be a phone conversation that a user would rather take at home, when driving, or before working hours. The learning algorithm considers both users' activity context in addition to the users' availability, and identifies an optimal (and recommended) scheduled time for the phone call. Thus, although calendar availability may show that the users are available at all times, the evaluation of user behavior and context may be used to redirect the call to a preferred time from the perspective of both users.

Aspects of the previously described offline logic 220 and online logic 240 may be implemented as part of an event scheduling service, such as the event scheduling service 150 depicted in FIG. 1. However, other aspects of the offline logic 220 and online logic 240 may be integrated for use with an intermediate computing device, software programs and logic executed on the mobile devices and wearable sensors 254, or directly into communication services (e.g., information services provided by communication or internet service providers).

Figure 3:
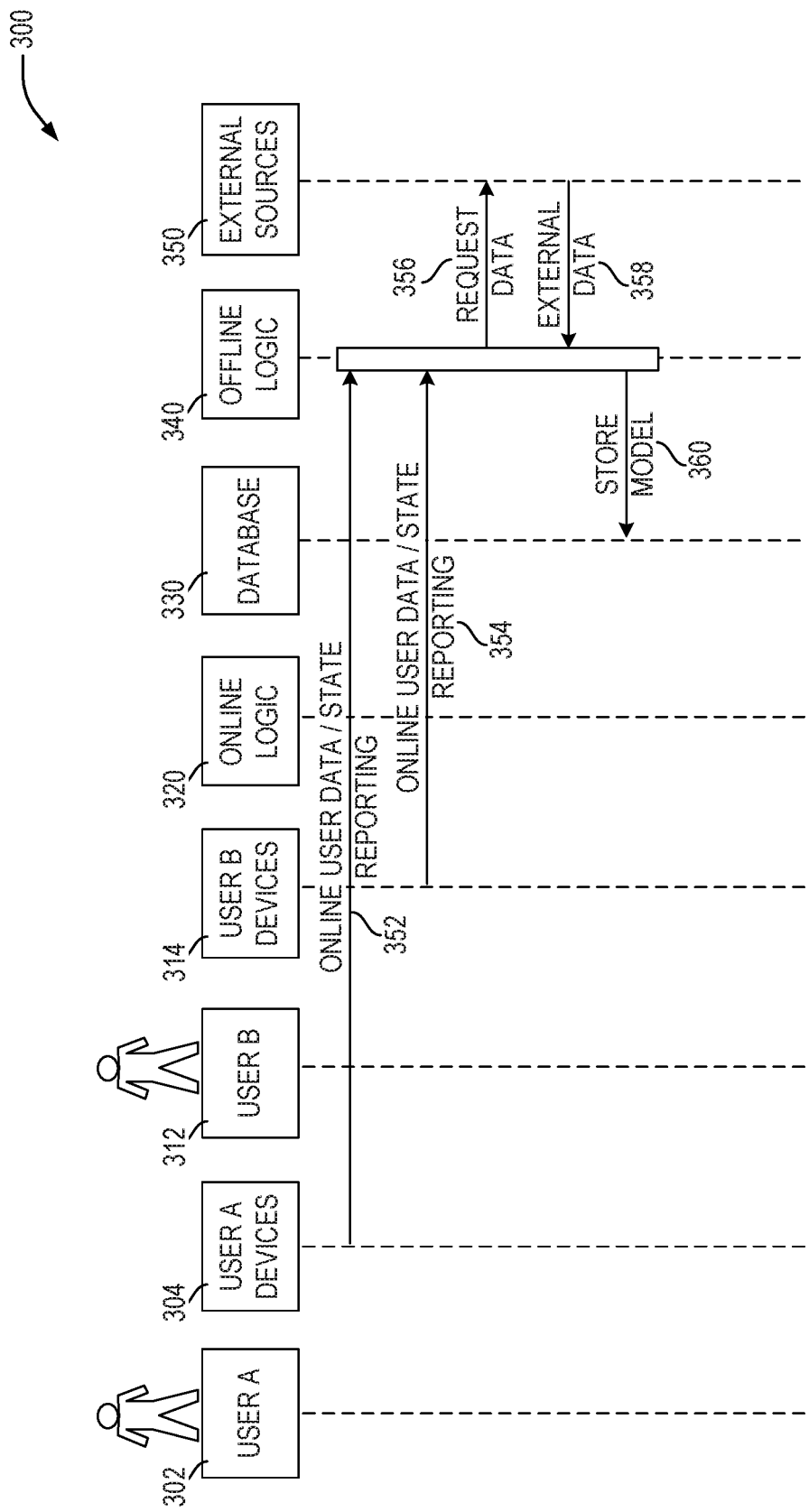
FIG. 3 illustrates a sequence diagram of communications performed to support a machine learning model of scheduling functions using offline logic, according to an example.

FIG. 3 illustrates an example sequence diagram 300 of communications performed to support a machine learning model using offline logic, according to an example. The sequence diagram 300 specifically illustrates a sequence of communications performed to support a machine learning model of scheduling and rescheduling functions based on offline logic.

In an example, the sequence diagram 300 may integrate the features of the offline logic, online logic, database, and external sources depicted in FIG. 2. As depicted, the sequence diagram 300 includes a first user, User A 302, operating one or more devices, User A devices 304; and a second user, User B 312, operating one or more devices, User B devices 314; online logic 320, a database 330, and offline logic 340; and external data sources 350.

Further to the examples of offline logic discussed above, the offline logic 340 in the sequence diagram 300 is used to obtain data and train a supervised machine learning model based on past behavior, activity, and context. For example, the machine learning model produced by the offline logic 340 may reflect patterns in the user's behavior regarding voice call events, by evaluating the actual voice calls that the user has performed in the past. This model may identify concepts such as: a user tends to answer calls from the user's workplace while driving; a user calls a specific phone number when leaving a work place; User A talks to user B on the phone every work day between 10:00 and 10:30 am; User C immediately returns calls from User D; and the like. The model and data needed to use it is stored in the database 330 for online use (e.g., for access and consumption by the online logic 320).

As a further example, the offline logic 340 and its inputs may also be used to assess the historical behavior of a user related to a communication event and the context of the communication event. For instance, if user Bob receives a phone call from his friend John while exercising on Wednesday evening, then the offline logic 320 may record the context of the communication (Wednesday, Evening, at the Gym, Exercising) and the specific caller (John). The historical contextual information for user Bob may indicate, however, that user Bob prefers to take calls from other callers (Mary, Joe, unknown callers) after exercising, as determined from a prior recorded behavior—such as from a Wednesday night where Bob chose to call Mary immediately after exercising and a Thursday night where Bob chose to call Joe 10 minutes after exercising.

Data is reported to the offline logic 340 by User A devices 304 (e.g., mobile/wearable sensors) through the use of online user data/state reporting 352, and by User B devices 314 (e.g., mobile/wearable sensors) through the use of online user data/state reporting 354. The offline logic 340 also requests data 356 and receives external data 358 from external data sources 350. Based on the data inputs from the reporting 352, 354 and external data 358, a machine learning model is calculated, trained, and stored 360 in the database 330. This training process may occur periodically to keep the model updated.

In an example, the online logic 320 operates to assist a scheduling operation in response to a user request to schedule an electronic communication event with another party. Current and future time slots for the communication event are evaluated by the model generated from offline logic 340 and ranked by their suitability for the type and characteristics of the event (e.g., a phone call). A scheduled time slot may be suggested to the user by order of suitability or the best time slot may be chosen automatically. The time slots may be either a specific hour ("16:30") or a semantic text string ("after the meeting") that has a contextual, relative, or temporal meaning.

In contrast to this approach, existing solutions today for scheduling events only take into account a user's calendar availability. Many types of communication events such as phone calls have constraints that do not apply to face-to-face meetings, such as: required duration for the call, tendency to talk during another activity (e.g. while driving), preferred locations for the call (work, home, car) and environmental constraints (such as noise). Existing digital assistants enable users to set up call reminders but require specifying the exact time for the call reminder. The online logic 320 and the use of a trained data model operates to evaluate the relevant information regarding all required attendees of the event and schedules (or re-schedule) the event accordingly to a machine-adaptive process. The online logic 320 operates to seamlessly coordinate the event taking into account necessary constraints and behavioral inputs, in a data-driven approach.

Figure 4:
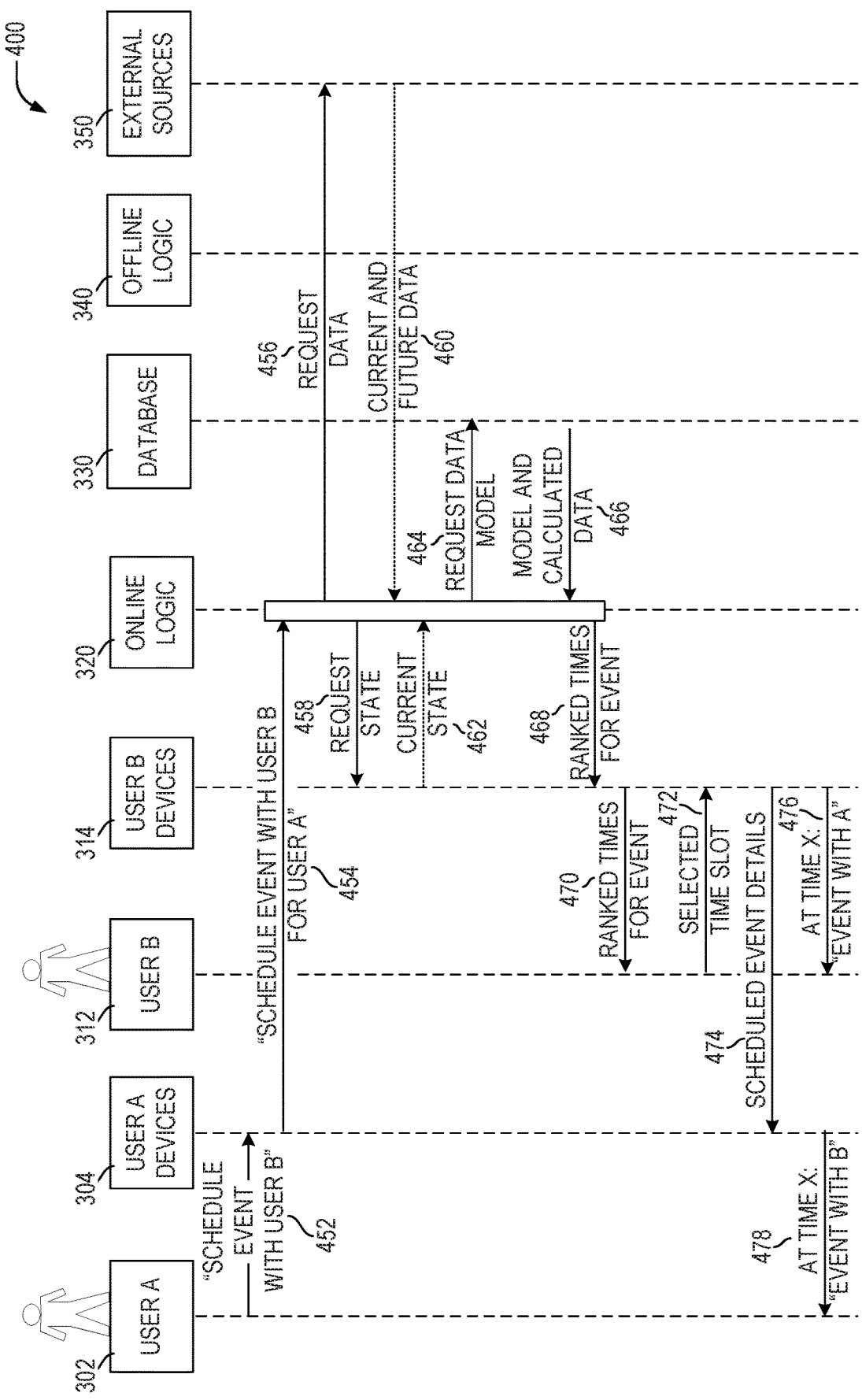
FIG. 4 illustrates a further sequence diagram of communications performed with event scheduling using a machine learning model implementing offline logic, according to an example.

FIG. 4 illustrates a further sequence diagram 400 of communications performed with event rescheduling using a machine learning model implementing online and offline logic, according to an example. As shown, the sequence diagram 400 includes features of the sequence diagram 300 described above for FIG. 3, including the users (302, 312), user devices (304, 314), and elements of the event scheduling services (320, 330, 340) and external data source 350.

In the example diagram 400 depicted in FIG. 4, User A 302 "requests" via the User A devices 304 (e.g., a mobile/wearable device of the user) to schedule an event 452 with User B 312. In response to the request 452, one of the User A devices 304 may transmit the request for the event 454 to the online logic 320. The request for the event 454 may be accompanied by the current state of User A 302, including any contextual information regarding the user's schedule, activity, or information from devices (e.g., sensor data).

In response to the request to schedule the event with User B 312, the online logic 320 gathers more information from User B 312. This information may be collected via a request 458 for a user state from one or more User B devices 314, and a response 462 that returns the current state data. Additionally, in response to the request to schedule the event with User B 312, the online logic 320 operates to request data 456 from one or more of the external data sources 350, such as weather, traffic, or event data types. The external data sources 350 return a data response 460 including current and future (e.g., projected) data for these data types.

The online logic 320 operates to provide a data model request 464 from a database 330 or other data store that hosts user-based machine learning models. Based on the characteristics of the users, the type of event, or state characteristics, the database 330 or data store returns a machine learning model and calculated data values 466 to consume the model. The online logic 320 then applies the calculated data, state data, and current and future data for the users and user activities into machine learning model, to determine schedule recommendations and predictions.

The schedule recommendations and predictions determined by the online logic 320 may be used to produce a plurality of ranked times for scheduling of an event, with such ranked times being communicated to the User B devices 314 with a communication 468 and output to the User B 312 with a data output 470. The plurality of ranked times for the scheduling of the event may be interacted with by the User B 312, to receive a selection of a time slot 472 with the User B devices 314.

In response to the selection of the time slot and other characteristics of the scheduled event, the User B devices 314 may communicate scheduled event details 474 for the upcoming event to User A devices 304, such as via electronic communication (including email, SMS, instant message, or like communication forms). In some examples, the scheduled event details 474 may be communicated in whole or in part to the User A devices 304 via the event scheduling service, an internet provider, or data service. Finally, based on the receipt of the schedule event details 474 at the User A devices 304 or the User B devices 314, a notification of the event may be output at the scheduled time. This may include a notification 476 at the scheduled time from the user B devices 314 to conduct the event with user A; and a notification 478 at the scheduled time from the user A devices 304 to conduct the event with user B.

FIG. 5 illustrates an example histogram 500 representing data used in machine learning model scheduling and rescheduling operations. For example, the histogram 500 depicts a modeling of the combined distribution of phone-calls that occur between two users, by hour of day. As shown, the two users tend to talk to each other between the working hours of 9 AM to 7 PM; with a majority of calls centered in mid-morning and late afternoons. This communication event activity between two users will be collected and analyzed as part of the offline data collection (e.g., depicted in FIG. 3), and integrated into a scheduling model of the user-based machine learning models.

FIG. 6 illustrates an example visualization 600 of a schedule implemented with model scheduling operations. This visualization corresponds a combined schedule of the users involved in the histogram 500 of FIG. 5. The visualization 600 of the schedule shows important meetings from 8 AM to 11 AM (indications 604, 606) and travel prior to these meetings (indications 602). As an assumption for this scenario, the users are unavailable or prefer to not to talk on the phone during a meeting.

In this scenario, the time slot 11:00-12:00 will be ranked high for a mutual phone call since the users tend to talk at this time and are available to talk. The 08:00-11:00 slot will be ranked low due to lack of availability in meetings, and 07:00-08:00 will be ranked low due to travel time and low incidence of calls between the users. Times between 12:00-15:00 will be ranked low since the users tend to talk less at these hours. As result, a proposed call may be automatically scheduled at 11:15 (indication 608), to allow conclusion of the prior meeting, and a schedule opening for the user during a lunch hour (indication 610).

Based on this automatic ranking and scheduling, a smart events timeline may be constructed and output to the user. A user may perform interaction functions such as adding reminders, updating events, and adjusting and recalculating a timeline, using time-based and activity-based semantic recommendations.

FIG. 7 illustrates an example chart representing data used in machine learning model scheduling operations. The chart specifically shows a user's distribution of phone calls by Activity/Means-of-Transport: 80% of the phone calls are performed while the user is In-Vehicle (indication 710), whereas 20% are performed while the user is Stationary (indication 720). In the scenario visualized by the chart, a semantic concept associated with the identified activity, such as "Next Drive", will be ranked high for a phone call. In a further example, an unsuccessful caller may be notified that the call will be scheduled to the next drive (without a specific hour). The caller will be reminded to call once beginning the activity.

Figure 8:
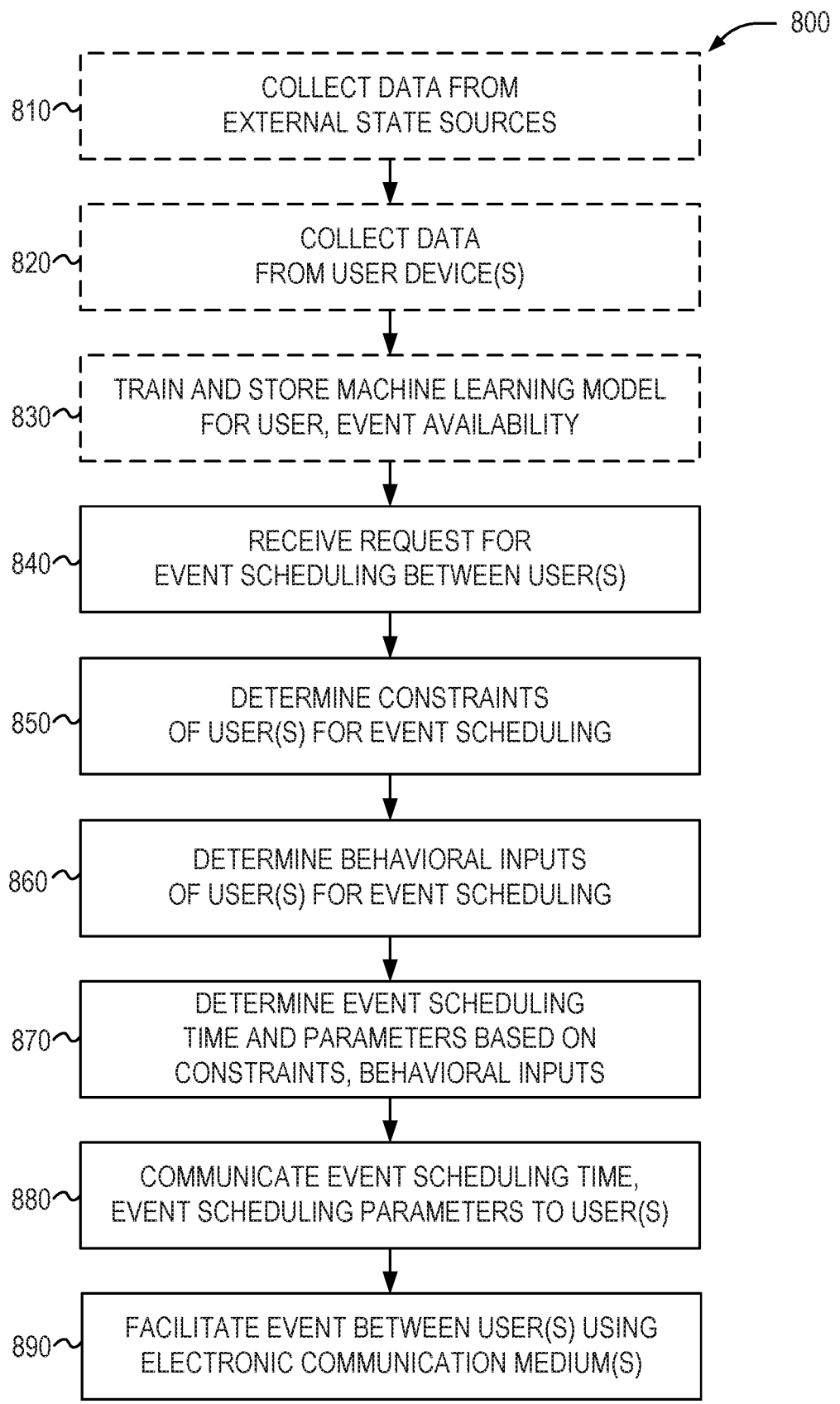
FIG. 8 illustrates a flowchart of a method performed by an event scheduling service for performing contextual event scheduling with a user device using a machine learning model, according to an example.

FIG. 8 illustrates a flowchart 800 of a method performed by an event scheduling service for performing contextual event scheduling using a machine learning model. In an example, the method of flowchart 800 is executed by a system including a remote computing device (e.g., server computing device), which comprises processing circuitry to perform the respective operations. However, it will be understood that the following techniques may be modified for additional or substitute processing actions at another data processing system or service, or a client user-operated device (e.g., smartphone or wearable device).

As shown, the flowchart 800 includes operations for programming offline logic used in a data model. These may include operations that collect data from external state sources (operation 810) and collect data from one or more user devices (operation 820), used as training data. Based on the training data, the machine learning model may be modified based on user and event availability, and the modifications to this machine learning model may be stored accordingly (operation 830). These operations for training may occur prior to a request for scheduling or rescheduling of a particular communication event (or, after the performance of a particular communication event, to provide updated training data for use in processing future requests).

The flowchart 800 further includes the depiction of operations at the event scheduling service (operations 840-890) for processing of an event scheduling request. The processing of the event rescheduling request may be initiated with the receipt of an indication of an event scheduling for a particular user communication event (operation 840), such as with a meeting request, phone call request, or like indication for an electronic communication event (e.g., in a communication or messaging software program). In response to the indication of the event rescheduling, the event scheduling service operates to retrieve or determine constraints of the scheduling (e.g., initiating) user, the other user, and other users involved in the prospective electronic communication event (operation 850). Additionally, the event scheduling service operates to retrieve or determine various activity and behavioral inputs of the users involved in the prospective electronic communication event (operation 860).

The constraints and behavior inputs that are determined for the users are used to determine a proposed event scheduling time and parameters (operation 870). These characteristics of the proposed event may also correspond to action options that are displayed and output as a contextual or semantic option (such as "conduct phone call after arriving at office"). The characteristics for the event scheduling time and parameters for the proposed event are then communicated to respective users (operation 880). In further examples, the time and scheduling parameters for a proposed event is provided as one of a plurality of ranked options, which may be selected or interacted with. Finally, in some examples, the scheduling service may facilitate the electronic communication event between the users via one or more electronic communication mediums (operation 890).

Figure 9:
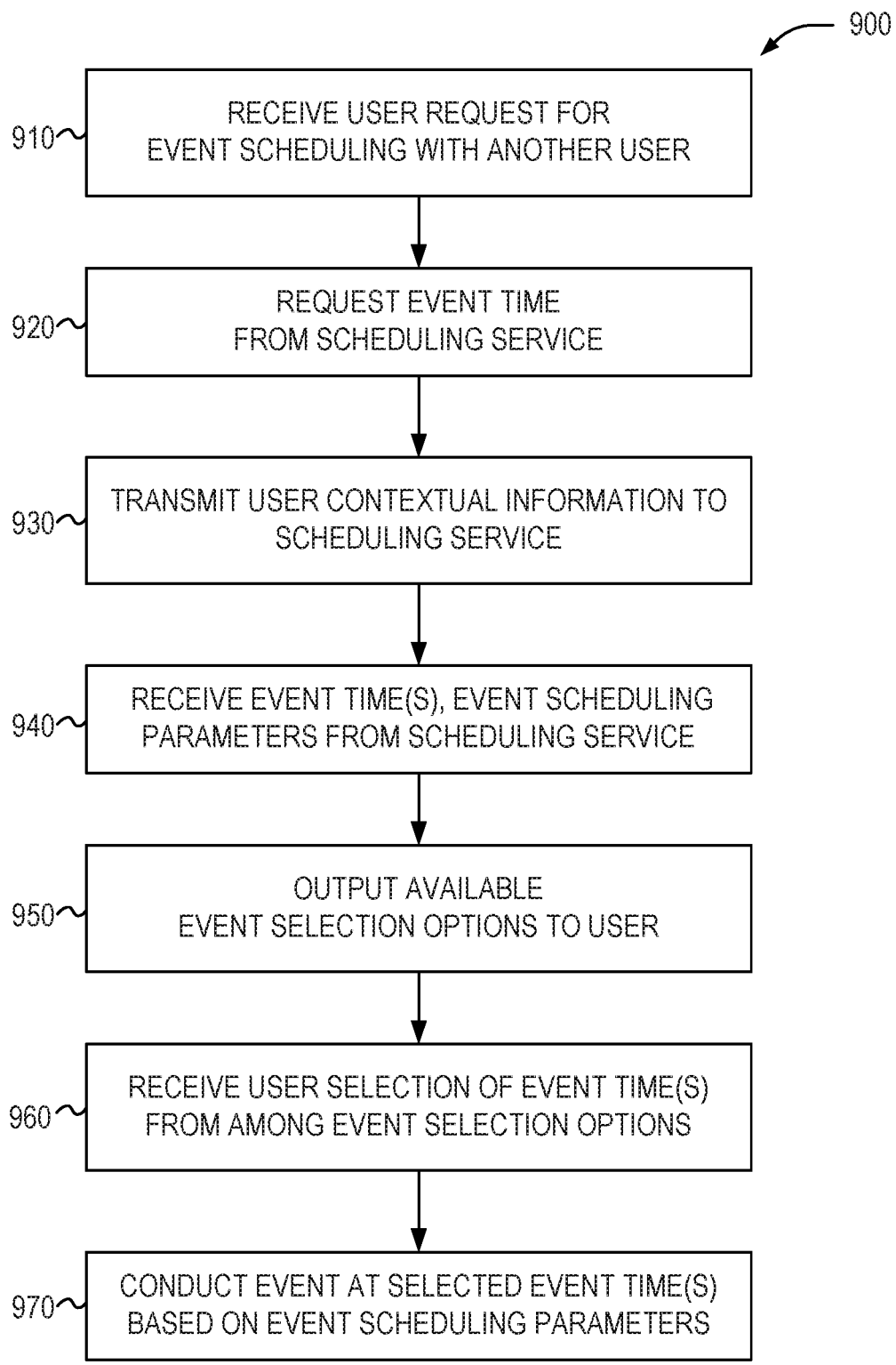
FIG. 9 illustrates a flowchart of a method performed by a user device for contextual event scheduling with an event scheduling service, according to an example.

FIG. 9 illustrates a flowchart 900 of an example method performed by a user device for contextual event scheduling with an event scheduling service. In an example, the method of flowchart 900 is executed by a system including a user-operated device (e.g., mobile computing device), which comprises processing circuitry to perform the respective operations. However, it will be understood that the following techniques may be modified for additional or substitute processing actions at the user-operated device, another user-operated device (e.g., wearable device), or a remote computing device (e.g., an event scheduling service or server).

As shown, the flowchart 900 begins with the receipt, at a user device, of an indication of a request for scheduling a communication event with another user (operation 910). This indication may be provided in a call or meeting request, a notification from a communication agent, or the like. In response to this indication, the user device requests an event scheduling time from a scheduling service (operation 920). The request for the event scheduling time to the scheduling service may be accompanied by the transmission of user contextual information such as activity data (operation 930).

In response to the request, the user device receives an event scheduling time and event scheduling parameters from the scheduling service (operation 940). This may correspond to the scheduling service communication (operation 880) discussed in FIG. 8. Based on the received event scheduling time and event scheduling parameters, at least one of event selection options are output to the user via the user device (operation 950). The user device then may receive a selection of the top ranked event action option (e.g., "Call after Meeting", if it is determined that the user is in a meeting), or the selection of an alternate event action option (e.g., "Call in Evening") (operation 960). The communication event may then be performed at the scheduled time, based on the conditions and characteristics of the selected event action option (operation 970).

Figure 10:
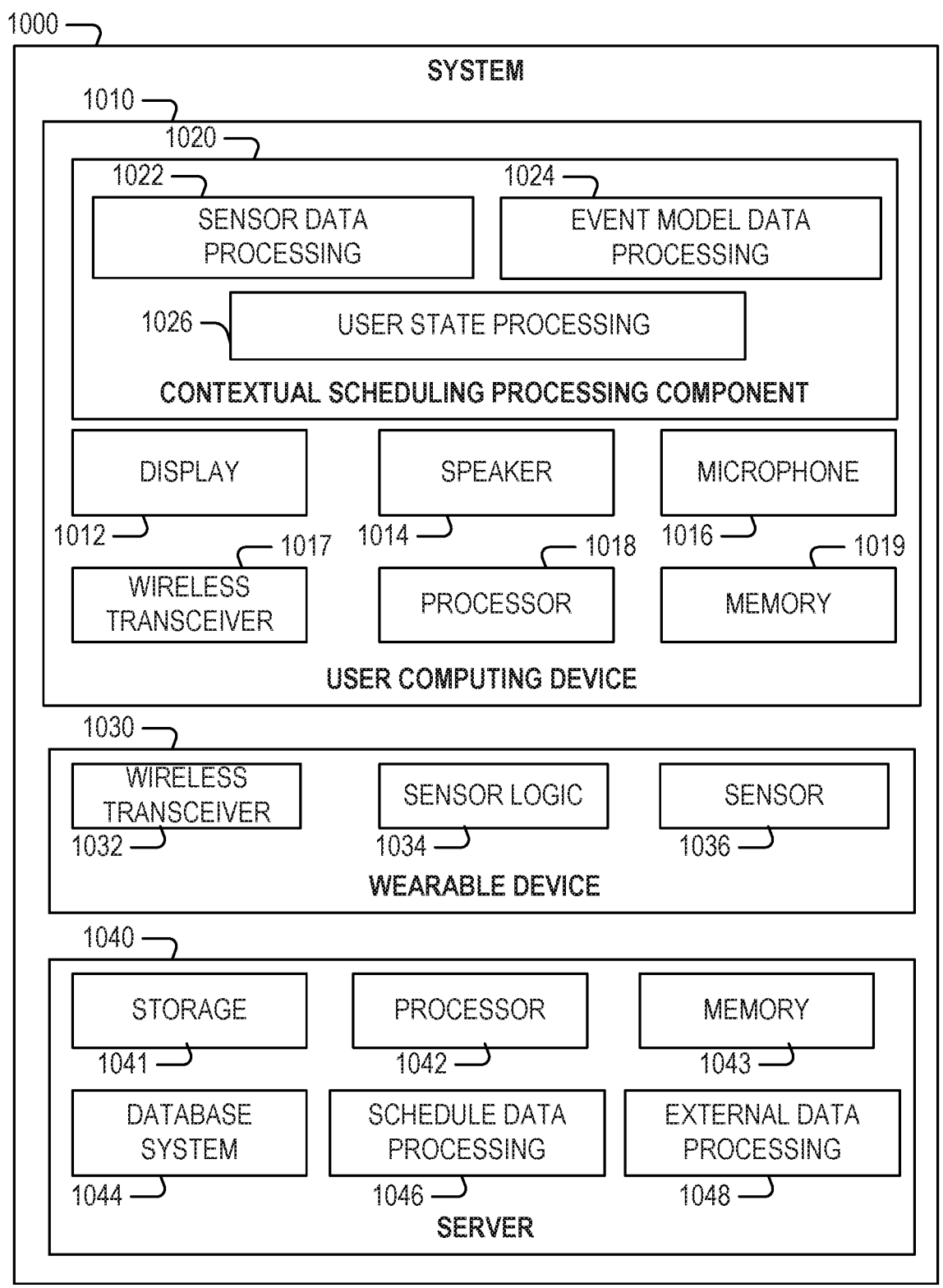
FIG. 10 illustrates a block diagram for an example system including a client computing device, a wearable device, and a server, configured to implement client-side and server-side features of an event scheduling service, according to an example.

FIG. 10 is a block diagram illustrating an example system 1000 including a user computing device 1010, a wearable device 1030, and a server 1040, implementing circuitry and structural electronic components that may be configured for implementation of the techniques described herein. In accordance with the previous described configurations, the system 1000 may have these devices operably coupled (e.g., communicatively coupled) with one another, but it will be understood that additional components (other wearable devices, sensors, databases, and processing components) may be integrated at a variety of locations in the system. Further, the capabilities of the user computing device 1010 and the wearable device 1030 may be integrated in some examples into a single apparatus (e.g., a smartphone with built-in sensors).

The user computing device 1010 is depicted as including a contextual scheduling processing component 1020, in addition to a display 1012, a speaker 1014, a microphone 1016, a wireless transceiver 1017, a processor 1018 (e.g., a CPU), and a memory 1019 (e.g., volatile or non-volatile memory). In an example, the contextual scheduling processing component 1020 may be provided from specialized hardware operating independent from the processor 1018 and the memory 1019; in other examples, the contextual scheduling processing component 1020 may be software-configured hardware that is implemented with use of the processor 1018 and the memory 1019 (e.g., by instructions executed by the processor 1018 and the memory 1019). Further, the display 1012 (e.g., a touchscreen display) may be used to generate a user interface to schedule the prospective electronic communication event, the speaker 1014 may be used to output audio related to the prospective electronic communication event, the microphone 1016 may be used to receive audio related to the prospective electronic communication event, and the wireless transceiver 1017 may be used to receive the sensor data from the wearable device 1030 (or perform wireless communications with communication networks).

The wearable device 1030 is depicted as including: a wireless transceiver 1032, sensor logic circuitry 1034, a sensor 1036, and other processing circuitry (not shown). For example, the sensor logic circuitry 1034 may be used to collect activity data from the sensor 1036; the wireless transceiver 1032 may be used to communicate the activity data (e.g., to the wireless transceiver 1017). Although the wearable device 1030 is depicted as being wearable (e.g., a wristwatch, wristband, integrated into clothing or shoes, etc.), these features may also be provided by other form factors of a sensor device (e.g., integrated into the user computing device 1010, integrated into another electronic device, or operating as a standalone device).

The contextual scheduling processing component 1020 of the user computing device 1010 may include respective processing components, such as implemented through specially configured hardware (including with specialized circuitry or with software executed with use of the processor 1018 and memory 1019). The contextual scheduling processing component 1020 may perform sensor data processing 1022 (e.g., to determine activity of the user based on the activity data received from the wearable device), user state processing 1026 (e.g., to generate contextual information related to a state of the user), and event model data processing 1024 (e.g., to transmit, to an event scheduling service that provides an trained machine learning model, a request to schedule a prospective electronic communication event, and to receive a proposed time and proposed scheduling parameters in response).

The server 1040 may include storage 1041, a processor 1042, a memory 1043, and operate to host and operate the event scheduling service. The server 1040 may further include a database system 1044 to store a trained machine learning model; schedule data processing component 1046 to receive a request to schedule the prospective electronic communication event, and operate the trained machine learning model to determine the proposed time and proposed scheduling parameters for the prospective electronic communication event; and an external data processing component 1048 to obtain external state data used by the trained machine learning model to determine constraints for the proposed time and proposed scheduling parameters.

Although many of the references to event scheduling were provided with reference to specialized communications over data networks, it will be understood that the techniques also may be performed via traditional phone networks and earlier-generation messaging networks (e.g., via email, SMS message, etc.). Thus, the present techniques may be used for scheduling of telephone conference calls, in addition to other forms of voice, video or other forms of human interaction.

Figure 11:
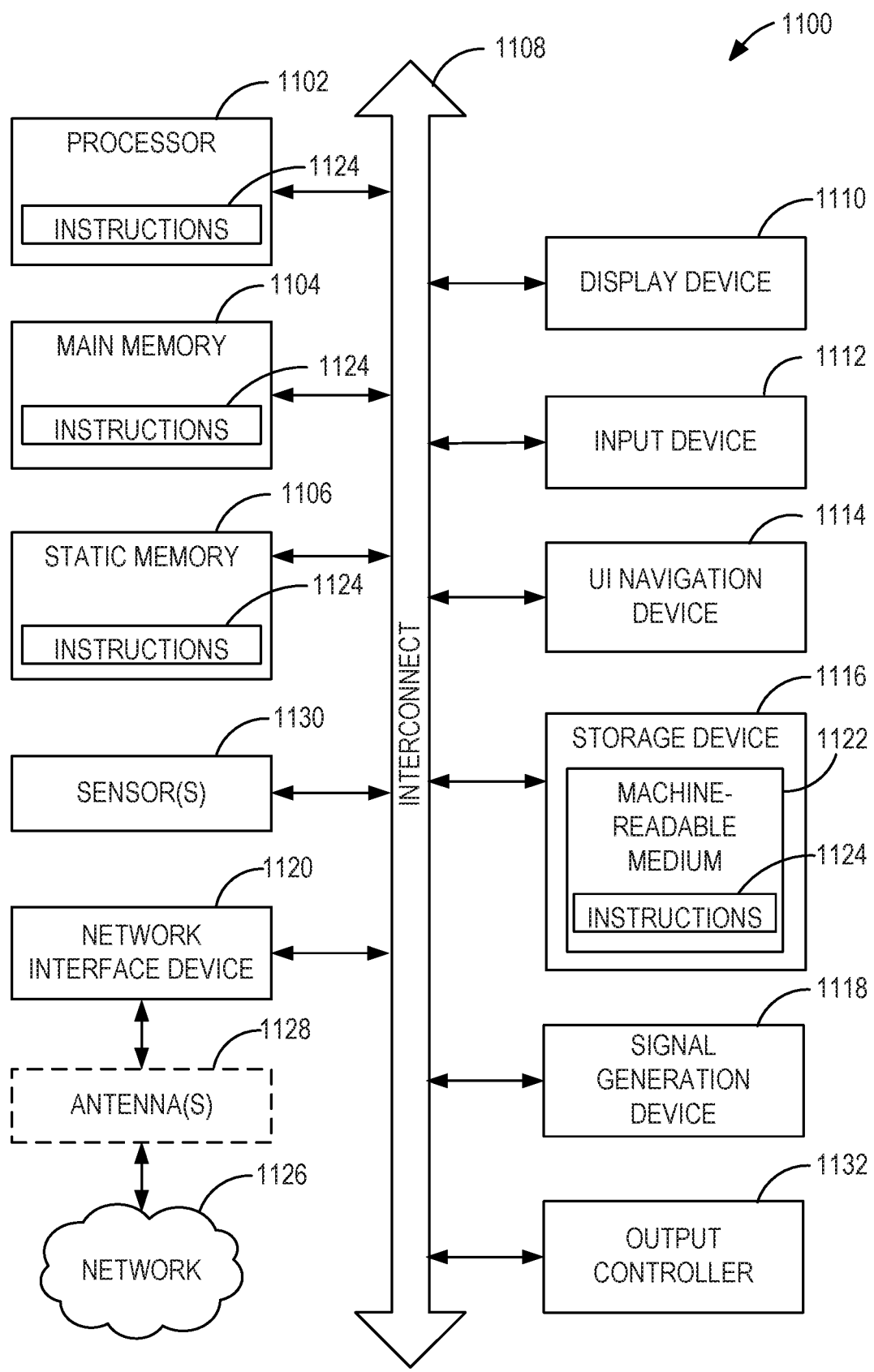
FIG. 11 illustrates a block diagram for an example computer system architecture upon which any one or more of the techniques (e.g., operations, processes, methods, and methodologies) discussed herein may be performed, according to an example.

FIG. 11 is a block diagram illustrating a machine in the example form of a computing system (e.g., computing device) 1100, within which a set or sequence of instructions may be executed to cause the machine to perform any one of the methodologies discussed herein, according to an example embodiment. The machine may be a personal computer (PC), a tablet PC, a hybrid tablet/notebook PC, a personal digital assistant (PDA), a mobile telephone or smartphone, a wearable computer, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via an interconnect 1108 (e.g., a link, a bus, etc.). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), an output controller 1132, a network interface device 1120 (which may include or operably communicate with one or more antennas 1128, transceivers, or other wireless communications hardware), and one or more sensors 1130, such as a global positioning system (GPS) sensor, compass, accelerometer, location sensor, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 via an antenna 1128 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a communication device, comprising: processing circuitry to: receive a request to schedule a prospective electronic communication event, wherein the prospective electronic communication event is scheduled to occur between the communication device operated by a user and another communication device operated by another user; transmit, to an event scheduling service, contextual information related to a state of the user, wherein the contextual information indicates a state of the communication device and activity of the user; and receive, from the event scheduling service, a proposed time and proposed scheduling parameters for the prospective electronic communication event, wherein the event scheduling service provides the proposed time and the proposed scheduling parameters in response to processing of the contextual information; wherein the event scheduling service uses a trained machine learning model to determine the proposed time and the proposed scheduling parameters based on the contextual information related to the state of the user.

In Example 2, the subject matter of Example 1 optionally includes the processing circuitry further to: receive a confirmation of the proposed time and the proposed scheduling parameters from the user; and conduct the prospective electronic communication event at the proposed time based on the proposed scheduling parameters, wherein the prospective electronic communication event is performed by establishing an electronic communication session from the communication device to the another communication device.

In Example 3, the subject matter of Example 2 optionally includes the processing circuitry further to: output the proposed time in a listing of a plurality of proposed event times, wherein the proposed time is ranked in the plurality of proposed event times by the event scheduling service; wherein operations to receive the confirmation of the proposed event time and the proposed scheduling parameters from the user include operations to receive a selection of the proposed event time from the listing of the plurality of proposed event times.

In Example 4, the subject matter of Example 3 optionally includes wherein the contextual information further indicates location data of the communication device, wherein the contextual information is used by the trained machine learning model of the event scheduling service to generate a ranking of the plurality of proposed event times, and wherein the trained machine learning model of the event scheduling service is trained for the user based on prior contextual information related to a historical state of the user.

In Example 5, the subject matter of any one or more of Examples 2-4 optionally include wherein the event scheduling service further evaluates contextual information of the another user and external state data to determine the proposed time and the proposed scheduling parameters, wherein the external state data evaluated by the event scheduling service includes at least one of: weather data, traffic data, and event data, and wherein the weather data, the traffic data, and the event data are obtained from respective external data sources.

In Example 6, the subject matter of any one or more of Examples 1-5 optionally include the processing circuitry further to: communicate the proposed time and the proposed scheduling parameters to the another communication device; wherein the request to schedule the prospective electronic communication event originates from the another user of the another communication device.

In Example 7, the subject matter of Example 6 optionally includes wherein the request to schedule the prospective electronic communication event is received from the another communication device via the event scheduling service, and wherein communication of the proposed time and the proposed scheduling parameters to the another communication device is transmitted to the another communication device via the event scheduling service.

In Example 8, the subject matter of any one or more of Examples 1-7 optionally include the processing circuitry further to: collect activity data from a connected device of the user, wherein the contextual information that indicates the activity of the user includes at least a portion of the activity data; wherein the activity data is used by the trained machine learning model to determine availability of the user for the prospective electronic communication event.

In Example 9, the subject matter of Example 8 optionally includes a wireless transceiver to communicate with the connected device; wherein operations to collect the activity data are performed prior to the request to schedule the prospective electronic communication event; and wherein the communication device is a network-connected mobile computing device used by the user, and wherein the connected device is a wearable activity sensor device used by the user.

In Example 10, the subject matter of any one or more of Examples 1-9 optionally include wherein the prospective electronic communication event is: a telephone call, a voice-over-IP call, a videoconference, or an online communication session.

Example 11 is a method, comprising electronic operations executed in processing circuitry of a communication device, wherein the electronic operations include: receiving a request to schedule a prospective electronic communication event, wherein the prospective electronic communication event is scheduled to occur between the communication device operated by a user and another communication device operated by another user; transmitting, to an event scheduling service, contextual information related to a state of the user, wherein the contextual information indicates a state of the communication device and activity of the user; and receiving, from the event scheduling service, a proposed time and proposed scheduling parameters for the prospective electronic communication event, wherein the event scheduling service provides the proposed time and the proposed scheduling parameters in response to processing of the contextual information; wherein the event scheduling service uses a trained machine learning model to determine the proposed time and the proposed scheduling parameters based on the contextual information related to the state of the user.

In Example 12, the subject matter of Example 11 optionally includes: receiving a confirmation of the proposed time and the proposed scheduling parameters from the user; and conducting the prospective electronic communication event at the proposed time based on the proposed scheduling parameters, wherein the prospective electronic communication event is performed by establishing an electronic communication session from the communication device to the another communication device.

In Example 13, the subject matter of Example 12 optionally includes: outputting the proposed time in a listing of a plurality of proposed event times, wherein the proposed time is ranked in the plurality of proposed event times by the event scheduling service; wherein receiving the confirmation of the proposed event time and the proposed scheduling parameters from the user include operations to receive a selection of the proposed event time from the listing of the plurality of proposed event times.

In Example 14, the subject matter of Example 13 optionally includes wherein the contextual information further indicates location data of the communication device, wherein the contextual information is used by the trained machine learning model of the event scheduling service to generate a ranking of the plurality of proposed event times, and wherein the trained machine learning model of the event scheduling service is trained for the user based on prior contextual information related to a historical state of the user.

In Example 15, the subject matter of any one or more of Examples 12-14 optionally include wherein the event scheduling service further evaluates contextual information of the another user and external state data to determine the proposed time and the proposed scheduling parameters, wherein the external state data evaluated by the event scheduling service includes at least one of: weather data, traffic data, and event data, and wherein the weather data, the traffic data, and the event data are obtained from respective external data sources.

In Example 16, the subject matter of any one or more of Examples 11-15 optionally include: communicating the proposed time and the proposed scheduling parameters to the another communication device; wherein the request to schedule the prospective electronic communication event originates from the another user of the another communication device.

In Example 17, the subject matter of Example 16 optionally includes wherein the request to schedule the prospective electronic communication event is received from the another communication device via the event scheduling service, and wherein communication of the proposed time and the proposed scheduling parameters to the another communication device is transmitted to the another communication device via the event scheduling service.

In Example 18, the subject matter of any one or more of Examples 11-17 optionally include: collecting activity data from a connected device of the user, wherein the contextual information that indicates the activity of the user includes at least a portion of the activity data; wherein the activity data is used by the trained machine learning model to determine availability of the user for the prospective electronic communication event.

In Example 19, the subject matter of Example 18 optionally includes wherein operations to collect the activity data are performed prior to the request to schedule the prospective electronic communication event, and wherein the communication device is a network-connected mobile computing device used by the user, and wherein the connected device is a wearable activity sensor device used by the user.

In Example 20, the subject matter of any one or more of Examples 11-19 optionally include wherein the prospective electronic communication event is: a telephone call, a voice-over-IP call, a videoconference, or an online communication session.

Example 21 is at least one machine readable medium including instructions, which when executed by a computing system, cause the computing system to perform any of the methods of Examples 11-20.

Example 22 is an apparatus comprising means for performing any of the methods of Examples 11-20.

Example 23 is an apparatus, comprising: means for receiving a request to schedule a prospective electronic communication event, wherein the prospective electronic communication event is scheduled to occur between a communication device operated by a user and another communication device operated by another user; means for transmitting, to an event scheduling service, contextual information related to a state of the user, wherein the contextual information indicates a state of the communication device and activity of the user; and means for receiving, from the event scheduling service, a proposed time and proposed scheduling parameters for the prospective electronic communication event, wherein the event scheduling service provides the proposed time and the proposed scheduling parameters in response to processing of the contextual information; wherein the event scheduling service uses a trained machine learning model to determine the proposed time and the proposed scheduling parameters based on the contextual information related to the state of the user.

In Example 24, the subject matter of Example 23 optionally includes means for receiving a confirmation of the proposed time and the proposed scheduling parameters from the user; and means for conducting the prospective electronic communication event at the proposed time based on the proposed scheduling parameters, wherein the prospective electronic communication event is performed by establishing an electronic communication session from the communication device to the another communication device.

In Example 25, the subject matter of Example 24 optionally includes means for outputting the proposed time in a listing of a plurality of proposed event times, wherein the proposed time is ranked in the plurality of proposed event times by the event scheduling service; wherein receiving the confirmation of the proposed event time and the proposed scheduling parameters from the user include operations to receive a selection of the proposed event time from the listing of the plurality of proposed event times.

In Example 26, the subject matter of Example 25 optionally includes wherein the contextual information further indicates location data of the communication device, wherein the contextual information is used by the trained machine learning model of the event scheduling service to generate a ranking of the plurality of proposed event times, and wherein the trained machine learning model of the event scheduling service is trained for the user based on prior contextual information related to a historical state of the user.

In Example 27, the subject matter of any one or more of Examples 24-26 optionally include wherein the event scheduling service further evaluates contextual information of the another user and external state data to determine the proposed time and the proposed scheduling parameters, wherein the external state data evaluated by the event scheduling service includes at least one of: weather data, traffic data, and event data, and wherein the weather data, the traffic data, and the event data are obtained from respective external data sources.

In Example 28, the subject matter of any one or more of Examples 23-27 optionally include means for communicating the proposed time and the proposed scheduling parameters to the another communication device; wherein the request to schedule the prospective electronic communication event originates from the another user of the another communication device.

In Example 29, the subject matter of Example 28 optionally includes wherein the request to schedule the prospective electronic communication event is received from the another communication device via the event scheduling service, and wherein communication of the proposed time and the proposed scheduling parameters to the another communication device is transmitted to the another communication device via the event scheduling service.

In Example 30, the subject matter of any one or more of Examples 23-29 optionally include means for collecting activity data from a connected device of the user, wherein the contextual information that indicates the activity of the user includes at least a portion of the activity data; wherein the activity data is used by the trained machine learning model to determine availability of the user for the prospective electronic communication event.

In Example 31, the subject matter of Example 30 optionally includes wherein operations to collect the activity data are performed prior to the request to schedule the prospective electronic communication event, and wherein the communication device is a network-connected mobile computing device used by the user, and wherein the connected device is a wearable activity sensor device used by the user.

In Example 32, the subject matter of any one or more of Examples 23-31 optionally include wherein the prospective electronic communication event is: a telephone call, a voice-over-IP call, a videoconference, or an online communication session.

Example 33 is a server computing system, comprising: an electronic storage; a processor and memory; a database system implemented with the processor, the memory, and the electronic storage; and a schedule data processing component to: receive a request to schedule a prospective electronic communication event, wherein the prospective electronic communication event is scheduled to occur between a first communication device operated by a first user and a second communication device operated by a second user; receive contextual information related to a state of the first user, wherein the contextual information indicates a state of the first communication device and activity of the first user; and operate a trained machine learning model to determine a proposed time and proposed scheduling parameters for the prospective electronic communication event based on the contextual information related to the state of the first user; and transmit, in response to the request and the contextual information, the proposed time and proposed scheduling parameters for the prospective electronic communication event.

In Example 34, the subject matter of Example 33 optionally includes wherein the schedule data processing component is further to: receive additional contextual information related to a state of the second user, wherein the additional contextual information indicates a state of the second communication device and activity of the second user; wherein operation of the trained machine learning model to determine the proposed time and proposed scheduling parameters for the prospective electronic communication event is further based on the additional contextual information related to the state of the second user.

In Example 35, the subject matter of Example 34 optionally includes wherein operation of the trained machine learning model to determine the proposed time and proposed scheduling parameters further includes an evaluation of constraints and behavioral inputs for the first user and the second user.

In Example 36, the subject matter of any one or more of Examples 33-35 optionally include an external data processing component to obtain external state data, wherein the external state data is used by the trained machine learning model to determine constraints for the proposed time and proposed scheduling parameters for the prospective electronic communication event.

In Example 37, the subject matter of Example 36 optionally includes wherein the external state data evaluated includes at least one of: weather data, traffic data, and event data, and wherein the weather data, the traffic data, and the event data are obtained from respective external data sources.

In Example 38, the subject matter of any one or more of Examples 33-37 optionally include wherein the contextual information further indicates location data of the first communication device and the second communication device.

In Example 39, the subject matter of any one or more of Examples 33-38 optionally include wherein the schedule data processing component is further to: generate a listing of a plurality of proposed event times, wherein the plurality of proposed event times includes the proposed time; wherein the proposed time is ranked in the plurality of proposed event times, and wherein the proposed time is transmitted with the listing of the plurality of proposed event times; and wherein the contextual information related to the state of the first user is used by the trained machine learning model to generate a ranking of the plurality of proposed event times.

In Example 40, the subject matter of any one or more of Examples 33-39 optionally include a data model training component, to: collect external data from external state sources; collect user data of the first user from the first communication device; and train the machine learning model for the first user, based on the external data and the user data, to predict schedule availability of the first user.

In Example 41, the subject matter of any one or more of Examples 33-40 optionally include wherein the trained machine learning model is trained for the first user based on prior contextual information obtained from historical activities of the first user.

In Example 42, the subject matter of any one or more of Examples 33-41 optionally include wherein the prospective electronic communication event is: a telephone call, a voice-over-IP call, a videoconference, or an online communication session.

Example 43 is a method, comprising electronic operations executed in processing circuitry of a server computing system, wherein the electronic operations include: receiving a request to schedule a prospective electronic communication event, wherein the prospective electronic communication event is scheduled to occur between a first communication device operated by a first user and a second communication device operated by a second user; receiving contextual information related to a state of the first user, wherein the contextual information indicates a state of the first communication device and activity of the first user; and operating a trained machine learning model to determine a proposed time and proposed scheduling parameters for the prospective electronic communication event based on the contextual information related to the state of the first user; and transmitting, in response to the request and the contextual information, the proposed time and proposed scheduling parameters for the prospective electronic communication event.

In Example 44, the subject matter of Example 43 optionally includes: receiving additional contextual information related to a state of the second user, wherein the additional contextual information indicates a state of the second communication device and activity of the second user; wherein operating the trained machine learning model to determine the proposed time and proposed scheduling parameters for the prospective electronic communication event is further based on the additional contextual information related to the state of the second user.

In Example 45, the subject matter of Example 44 optionally includes wherein operating the trained machine learning model to determine the proposed time and proposed scheduling parameters further includes an evaluation of constraints and behavioral inputs for the first user and the second user.

In Example 46, the subject matter of any one or more of Examples 43-45 optionally include: obtaining external state data, wherein the external state data is used by the trained machine learning model to determine constraints for the proposed time and proposed scheduling parameters for the prospective electronic communication event.

In Example 47, the subject matter of Example 46 optionally includes wherein the external state data evaluated includes at least one of: weather data, traffic data, and event data; and wherein the weather data, the traffic data, and the event data are obtained from respective external data sources.

In Example 48, the subject matter of any one or more of Examples 43-47 optionally include wherein the contextual information further indicates location data of the first communication device and the second communication device.

In Example 49, the subject matter of any one or more of Examples 43-48 optionally include: generating a listing of a plurality of proposed event times, wherein the plurality of proposed event times includes the proposed time; wherein the proposed time is ranked in the plurality of proposed event times, and wherein the proposed time is transmitted with the listing of the plurality of proposed event times; and wherein the contextual information related to the state of the first user is used by the trained machine learning model to generate a ranking of the plurality of proposed event times.

In Example 50, the subject matter of any one or more of Examples 43-49 optionally include: collecting external data from external state sources; collecting user data of the first user from the first communication device; and training the machine learning model for the first user, based on the external data and the user data, to predict schedule availability of the first user.

In Example 51, the subject matter of any one or more of Examples 43-50 optionally include wherein the trained machine learning model is trained for the first user based on prior contextual information obtained from historical activities of the first user.

In Example 52, the subject matter of any one or more of Examples 43-51 optionally include wherein the prospective electronic communication event is: a telephone call, a voice-over-IP call, a videoconference, or an online communication session.

Example 53 is at least one machine readable medium including instructions, which when executed by a computing system, cause the computing system to perform any of the methods of Examples 43-52.

Example 54 is an apparatus comprising means for performing any of the methods of Examples 43-52.

Example 55 is an apparatus, comprising: means for receiving a request to schedule a prospective electronic communication event, wherein the prospective electronic communication event is scheduled to occur between a first communication device operated by a first user and a second communication device operated by a second user; means for receiving contextual information related to a state of the first user, wherein the contextual information indicates a state of the first communication device and activity of the first user; and means for operating a trained machine learning model to determine a proposed time and proposed scheduling parameters for the prospective electronic communication event based on the contextual information related to the state of the first user; and means for transmitting, in response to the request and the contextual information, the proposed time and proposed scheduling parameters for the prospective electronic communication event.

In Example 56, the subject matter of Example 55 optionally includes means for receiving additional contextual information related to a state of the second user, wherein the additional contextual information indicates a state of the second communication device and activity of the second user; wherein operating the trained machine learning model to determine the proposed time and proposed scheduling parameters for the prospective electronic communication event is further based on the additional contextual information related to the state of the second user.

In Example 57, the subject matter of Example 56 optionally includes wherein operating the trained machine learning model to determine the proposed time and proposed scheduling parameters further includes an evaluation of constraints and behavioral inputs for the first user and the second user.

In Example 58, the subject matter of any one or more of Examples 55-57 optionally include means for obtaining external state data, wherein the external state data is used by the trained machine learning model to determine constraints for the proposed time and proposed scheduling parameters for the prospective electronic communication event.

In Example 59, the subject matter of Example 58 optionally includes wherein the external state data evaluated includes at least one of: weather data, traffic data, and event data; and wherein the weather data, the traffic data, and the event data are obtained from respective external data sources.

In Example 60, the subject matter of any one or more of Examples 55-59 optionally include wherein the contextual information further indicates location data of the first communication device and the second communication device.

In Example 61, the subject matter of any one or more of Examples 55-60 optionally include means for generating a listing of a plurality of proposed event times, wherein the plurality of proposed event times includes the proposed time; wherein the proposed time is ranked in the plurality of proposed event times, and wherein the proposed time is transmitted with the listing of the plurality of proposed event times; and wherein the contextual information related to the state of the first user is used by the trained machine learning model to generate a ranking of the plurality of proposed event times.

In Example 62, the subject matter of any one or more of Examples 55-61 optionally include means for collecting external data from external state sources; means for collecting user data of the first user from the first communication device; and means for training the machine learning model for the first user, based on the external data and the user data, to predict schedule availability of the first user.

In Example 63, the subject matter of any one or more of Examples 55-62 optionally include wherein the trained machine learning model is trained for the first user based on prior contextual information obtained from historical activities of the first user.

In Example 64, the subject matter of any one or more of Examples 55-63 optionally include wherein the prospective electronic communication event is: a telephone call, a voice-over-IP call, a videoconference, or an online communication session.

Example 65 is a system, comprising: a wearable device, comprising: a sensor; sensor logic circuitry to obtain activity data from the sensor, the activity data indicating activity of a user of the wearable device that is sensed by the sensor; and a wireless transceiver to communicate the activity data; and a computing device, comprising: a processor and memory; a wireless transceiver to receive the activity data from the wearable device; a sensor data processing component implemented with the processor and the memory, the sensor data processing component to determine activity of the user based on the activity data received from the wearable device; a user state processing component implemented with the processor and the memory, the user state processing component to generate contextual information related to a state of the user, wherein the contextual information indicates a state of the computing device and the activity of the user; and an event model data processing component implemented with the processor and the memory, the event model data processing component to: transmit, to an event scheduling service, a request to schedule a prospective electronic communication event, wherein the request includes the contextual information related to a state of the user; and receive, from the event scheduling service, a proposed time and proposed scheduling parameters for the prospective electronic communication event; wherein the prospective electronic communication event is scheduled to occur between the computing device operated by the user and another communication device operated by another user; wherein the event scheduling service provides the proposed time and the proposed scheduling parameters in response to processing of the contextual information; wherein the event scheduling service uses a trained machine learning model to determine the proposed time and the proposed scheduling parameters based on the contextual information related to the state of the user; and wherein the activity data is used by the trained machine learning model to determine availability of the user for the prospective electronic communication event.

In Example 66, the subject matter of Example 65 optionally includes a server to host the event scheduling service, the server comprising: electronic storage; a processor and memory; a database system implemented with the processor, the memory, and the electronic storage of the server, the database system to store the trained machine learning model; a schedule data processing component to: receive the request to schedule the prospective electronic communication event; receive contextual information related to a state of the user, wherein the contextual information indicates a state of the computing device and activity of the user; and operating the trained machine learning model to determine the proposed time and proposed scheduling parameters for the prospective electronic communication event based on the contextual information related to the state of the user; and transmit, in response to the request and the contextual information, the proposed time and proposed scheduling parameters for the prospective electronic communication event.

In Example 67, the subject matter of Example 66 optionally includes wherein the contextual information further indicates location data of the user computing device operated by the user.

In Example 68, the subject matter of any one or more of Examples 66-67 optionally include wherein the schedule data processing component is further to: generate a listing of a plurality of proposed event times, wherein the plurality of proposed event times includes the proposed time; wherein the proposed time is ranked in the plurality of proposed event times, and wherein the proposed time is transmitted with the listing of the plurality of proposed event times; wherein the contextual information related to the state of the user is used by the trained machine learning model to generate a ranking of the plurality of proposed event times.

In Example 69, the subject matter of Example 68 optionally includes the server further comprising: an external data processing component to obtain external state data, wherein the external state data is used by the trained machine learning model to determine constraints for the proposed time and proposed scheduling parameters for the prospective electronic communication event.

In Example 70, the subject matter of Example 69 optionally includes wherein the external state data evaluated by the event scheduling service includes at least one of: weather data, traffic data, and event data, and wherein the weather data, the traffic data, and the event data are obtained from respective external data sources.

In Example 71, the subject matter of any one or more of Examples 69-70 optionally include wherein the schedule data processing component is further to evaluate contextual information of the another user and the external state data to determine the proposed time and the proposed scheduling parameters.

In Example 72, the subject matter of any one or more of Examples 65-71 optionally include the user computing device further comprising: a touchscreen display to generate a user interface to schedule the prospective electronic communication event, wherein the user interface includes features to receive the request to schedule the prospective electronic communication event.

In Example 73, the subject matter of Example 72 optionally includes the user computing device further comprising: a speaker to output audio related to the prospective electronic communication event; and a microphone to receive audio related to the prospective electronic communication event.

In Example 74, the subject matter of any one or more of Examples 65-73 optionally include wherein the prospective electronic communication event is: a telephone call, a voice-over-IP call, a videoconference, or an online communication session.

Example 75 is a computing device, comprising: a user state processing component implemented with a processor and memory, the user state processing component to generate contextual information related to a state of a user, wherein the contextual information indicates a state of the computing device and user activity data; and an event model data processing component implemented with the processor and the memory, the event model data processing component to: transmit, to an event scheduling service, a request to schedule a prospective electronic communication event, wherein the request includes the contextual information related to a state of the user; and receive, from the event scheduling service, a proposed time and proposed scheduling parameters for the prospective electronic communication event.

In Example 76, the subject matter of Example 75 optionally includes wherein the prospective electronic communication event is scheduled to occur between the computing device operated by the user and another communication device operated by another user.

In Example 77, the subject matter of any one or more of Examples 75-76 optionally include wherein the event scheduling service provides the proposed time and the proposed scheduling parameters in response to processing of the contextual information.

In Example 78, the subject matter of any one or more of Examples 75-77 optionally include wherein the event scheduling service uses a trained machine learning model to determine the proposed time and the proposed scheduling parameters based on the contextual information related to the state of the user.

In Example 79, the subject matter of any one or more of Examples 75-78 optionally include wherein the user activity data is used by a trained machine learning model of the event scheduling service to determine availability of the user for the prospective electronic communication event.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:
1. A communication device, comprising:
processing circuitry to:
receive a request to schedule a prospective electronic communication event, wherein the prospective electronic communication event is scheduled to occur between the communication device operated by a user and another communication device operated by another user and wherein the request includes an event type for the prospective electronic communication event;
transmit, to an event scheduling service, contextual information related to a state of the user, wherein the contextual information indicates a state of the communication device and current activity of the user as indicated by a sensor of the communication device; and
receive, from the event scheduling service, a proposed time and proposed scheduling parameters for the prospective electronic communication event, wherein the event scheduling service provides the proposed time and the proposed scheduling param- eters in response to processing of the contextual information and the event type;
wherein the event scheduling service uses a trained machine learning model to determine the proposed time and the proposed scheduling parameters based on the contextual information related to the state of the user and the event type, and wherein the trained machine learning model is pretrained using routine activity data and event types associated with the user, the routine activity specific to the user collected over time from each of the communication device and a second device operated by the user, each of the devices providing at least a portion of the routine activity data and each of the devices providing different aspects of the routine activity data, and the event types indicating a mode of communication for the communication device and the another communication device during the prospective electronic communication event.

2. The communication device of claim 1, the processing circuitry further to:
receive a confirmation of the proposed time and the proposed scheduling parameters from the user; and
conduct the prospective electronic communication event at the proposed time based on the proposed scheduling parameters, wherein the prospective electronic communication event is performed by establishing an electronic communication session from the communication device to the another communication device.

3. The communication device of claim 2, the processing circuitry further to:
output the proposed time in a listing of a plurality of proposed event times, wherein the proposed time is ranked in the plurality of proposed event times by the event scheduling service;
wherein operations to receive the confirmation of the proposed event time and the proposed scheduling parameters from the user include operations to receive a selection of the proposed event time from the listing of the plurality of proposed event times.

4. The communication device of claim 3,
wherein the contextual information further indicates location data of the communication device,
wherein the contextual information is used by the trained machine learning model of the event scheduling service to generate a ranking of the plurality of proposed event times, and
wherein the trained machine learning model of the event scheduling service is trained for the user based on prior contextual information related to a historical state of the user.

5. The communication device of claim 2,
wherein the event scheduling service further evaluates contextual information of the another user and external state data to determine the proposed time and the proposed scheduling parameters,
wherein the external state data evaluated by the event scheduling service includes at least one of:
weather data, traffic data, and event data, and wherein the weather data, the traffic data, and the event data are obtained from respective external data sources.

6. The communication device of claim 1, the processing circuitry further to:
communicate the proposed time and the proposed scheduling parameters to the another communication device;
wherein the request to schedule the prospective electronic communication event originates from the another user of the another communication device.

7. The communication device of claim 6,
wherein the request to schedule the prospective electronic communication event is received from the another communication device via the event scheduling service, and
wherein communication of the proposed time and the proposed scheduling parameters to the another communication device is transmitted to the another communication device via the event scheduling service.

8. The communication device of claim 1, the processing circuitry further to:
collect activity data from a connected device of the user, wherein the contextual information that indicates the activity of the user includes at least a portion of the activity data;
wherein the activity data is used by the trained machine learning model to determine availability of the user for the prospective electronic communication event.

9. The communication device of claim 8, further comprising:
a wireless transceiver to communicate with the connected device;
wherein operations to collect the activity data are performed prior to the request to schedule the prospective electronic communication event; and
wherein the communication device is a network-connected mobile computing device used by the user, and wherein the connected device is a wearable activity sensor device used by the user.

10. The communication device of claim 1,
wherein the event type of the prospective electronic communication event is: a telephone call, a voice-over-IP call, a videoconference, or an online communication session.

11. At least one non-transitory machine readable storage medium, comprising a plurality of instructions that, responsive to being executed with processor circuitry of a communication device, cause the communication device to perform electronic operations that:
receive a request to schedule a prospective electronic communication event, wherein the prospective electronic communication event is scheduled to occur between the communication device operated by a user and another communication device operated by another user and wherein the request includes an event type for the prospective electronic communication event;
transmit, to an event scheduling service, contextual information related to a state of the user, wherein the contextual information indicates a state of the communication device and current activity of the user as indicated by a sensor of the communication device; and
receive, from the event scheduling service, a proposed time and proposed scheduling parameters for the prospective electronic communication event, wherein the event scheduling service provides the proposed time and the proposed scheduling parameters in response to processing of the contextual information and the event type;
wherein the event scheduling service uses a trained machine learning model to determine the proposed time and the proposed scheduling parameters based on the contextual information related to the state of the user and the event type, and wherein the trained machine learning model is pretrained using routine activity data and event types associated with the user, the routine activity specific to the user collected over time from each of the communication device and a second device operated by the user, each of the devices providing at least a portion of the routine activity data and each of the devices providing different aspects of the routine activity data, and the event types indicating a mode of communication for the communication device and the another communication device during the prospective electronic communication event.

12. The non-transitory machine readable storage medium of claim 11, wherein the electronic operations further:
receive a confirmation of the proposed time and the proposed scheduling parameters from the user; and
conduct the prospective electronic communication event at the proposed time based on the proposed scheduling parameters, wherein the prospective electronic communication event is performed by establishing an electronic communication session from the communication device to the another communication device.

13. The non-transitory machine readable storage medium of claim 12, wherein the electronic operations further:
output the proposed time in a listing of a plurality of proposed event times, wherein the proposed time is ranked in the plurality of proposed event times by the event scheduling service;
wherein receipt of the confirmation of the proposed event time and the proposed scheduling parameters from the user include operations to receive a selection of the proposed event time from the listing of the plurality of proposed event times.

14. The non-transitory machine readable storage medium of claim 13,
wherein the contextual information further indicates location data of the communication device,
wherein the contextual information is used by the trained machine learning model of the event scheduling service to generate a ranking of the plurality of proposed event times, and
wherein the trained machine learning model of the event scheduling service is trained for the user based on prior contextual information related to a historical state of the user.

15. The non-transitory machine readable storage medium of claim 12,
wherein the event scheduling service further evaluates contextual information of the another user and external state data to determine the proposed time and the proposed scheduling parameters,
wherein the external state data evaluated by the event scheduling service includes at least one of: weather data, traffic data, and event data, and
wherein the weather data, the traffic data, and the event data are obtained from respective external data sources.

16. The non-transitory machine readable storage medium of claim 11, wherein the electronic operations further:
communicate the proposed time and the proposed scheduling parameters to the another communication device;
wherein the request to schedule the prospective electronic communication event originates from the another user of the another communication device.

17. The non-transitory machine readable storage medium of claim 16,
wherein the request to schedule the prospective electronic communication event is received from the another communication device via the event scheduling service, and
wherein communication of the proposed time and the proposed scheduling parameters to the another communication device is transmitted to the another communication device via the event scheduling service.

18. The non-transitory machine readable storage medium of claim 11, wherein the electronic operations further:
collect activity data from a connected device of the user, wherein the contextual information that indicates the activity of the user includes at least a portion of the activity data;
wherein the activity data is used by the trained machine learning model to determine availability of the user for the prospective electronic communication event.

19. The non-transitory machine readable storage medium of claim 18,
wherein operations to collect the activity data are performed prior to the request to schedule the prospective electronic communication event, and
wherein the communication device is a network-connected mobile computing device used by the user, and wherein the connected device is a wearable activity sensor device used by the user.

20. The non-transitory machine readable storage medium of claim 11,
wherein the prospective electronic communication event is: a telephone call, a voice-over-IP call, a videoconference, or an online communication session.

21. A computing device, comprising:
a user state processing component implemented with a processor and memory, the user state processing component to generate contextual information related to a state of a user, wherein the contextual information indicates a state of the computing device and current user activity data as indicated by a sensor of the computing device; and
an event model data processing component implemented with the processor and the memory, the event model data processing component to:
transmit, to an event scheduling service, a request to schedule a prospective electronic communication event, wherein the request includes the contextual information related to a state of the user and wherein the request includes an event type for the prospective electronic communication event; and
receive, from the event scheduling service, a proposed time and proposed scheduling parameters for the prospective electronic communication event, wherein the event scheduling service provides the proposed time and the proposed scheduling parameters in response to processing of the contextual information and the event type;
wherein the event scheduling service uses a trained machine learning model to determine the proposed time and the proposed scheduling parameters based on the contextual information related to the state of the user and the event type, and wherein the trained machine learning model is pretrained using routine activity data and event types associated with the user, the routine activity specific to the user collected over time from each of the communication device and a second device operated by the user, each of the devices providing at least a portion of the routine activity data and each of the devices providing different aspects of the routine activity data, and the event types indicating a mode of communication for the communication device during the prospective electronic communication event.

22. The computing device of claim 21,
wherein the prospective electronic communication event is scheduled to occur between the computing device operated by the user and another communication device operated by another user.

23. The computing device of claim 21,
wherein the event scheduling service provides the proposed time and the proposed scheduling parameters in response to processing of the contextual information.

24. The computing device of claim 21,
wherein the event scheduling service uses a trained machine learning model to determine the proposed time and the proposed scheduling parameters based on the contextual information related to the state of the user.

25. The computing device of claim 21,
wherein the user activity data is used by a trained machine learning model of the event scheduling service to determine availability of the user for the prospective electronic communication event.

* * * * *